Figure 1:
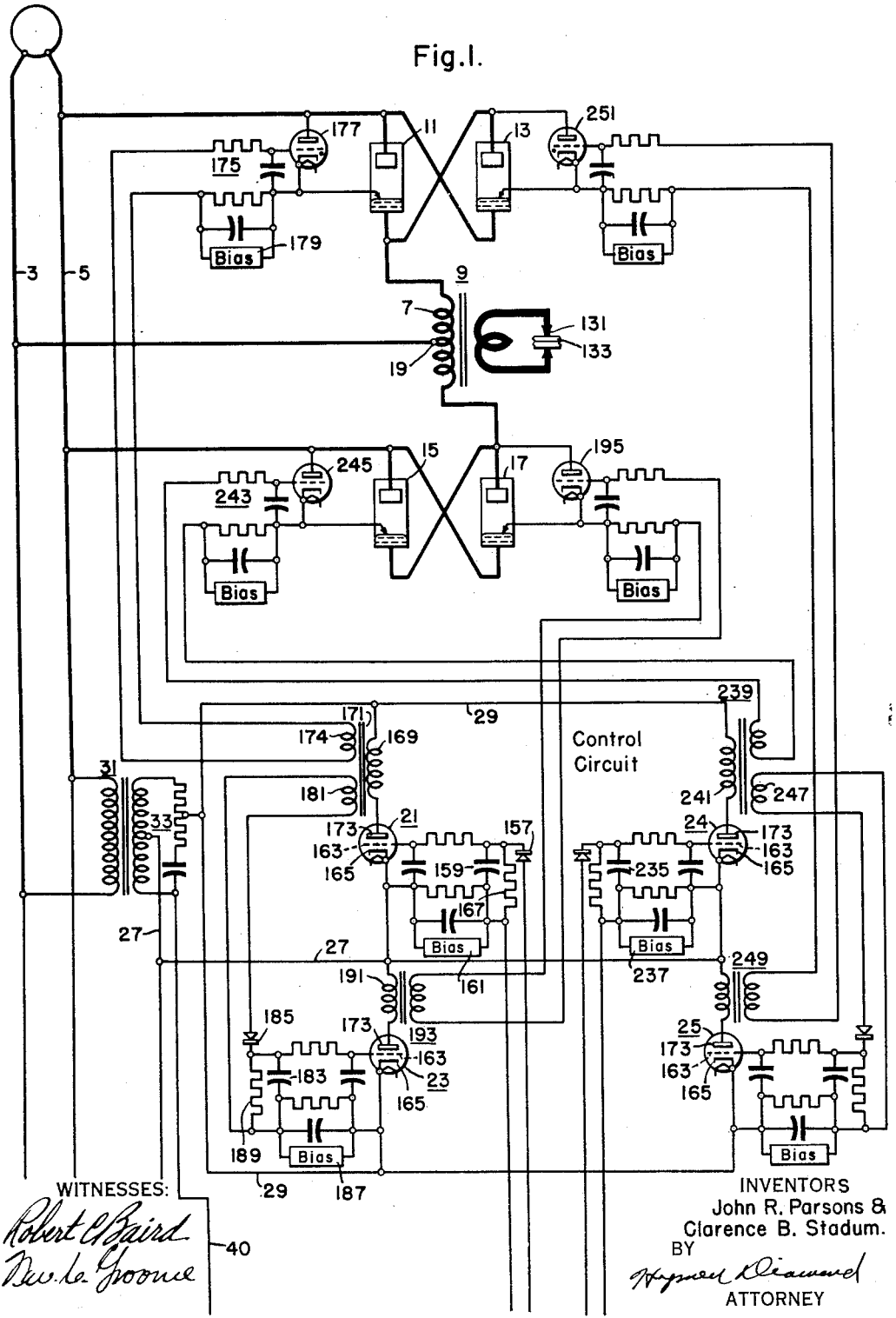

Patented June 6, 1950

2,510,652

UNITED STATES PATENT OFFICE 2,510,652

SINGLE-PHASE LOW-FREQUENCY CONTROL FOR WELDING

John R. Parsons, Kenmore, and Clarence B. Stadum, Snyder, N. Y., assignors to Westinghouse Electric Corporation, East Pittsburgh, Pa., a corporation of Pennsylvania Application September 30, 1948, Serial No. 52,104

13 Claims. (Cl. 315—250)

Our invention relates to electric discharge apparatus and it has particular relation to power supply apparatus for loads, such as resistance welders which draw current of large magnitude intermittently.

In resistance welding systems most frequently encountered in industry, current is supplied from a single phase power supply of commercial frequency, 60 cycles per second in the United States, 50 in European countries, to a welding transformer which consists of a primary having a substantial number of turns and a secondary having one or two turns. Alternating current of the commercial frequency is transmitted through the secondary and the work to be welded. This current may vary from the order of 1000 amperes for thin materials of certain types to tens of thousands of amperes for thick materials of certain types. At such high currents the reactance of the welding transformer is substantial. Since the work is in effect the only load resistance in this circuit, the reactance may be greater than the resistance and the power factor may be relatively low. We have encountered power factors as low as 25 to 50%. Another disadvantageous feature of prior art welders arises from skin effect. Current of ordinary magnitudes supplied at a frequency of 50 or 60 cycles does not have a substantial skin effect. When the magnitude reaches thousands or tens of thousands of amperes, as in a welding system, the skin effect becomes appreciable. In the prior art welding systems described, a large proportion of the welding current flows in the region of the periphery of the secondary coil and of the welding electrodes because of the skin effect. This non-uniformity of the welding current distribution is not alone an uneconomic factor; it also impairs the quality of the weld which is produced. This condition is particularly aggravated where the material to be welded is of substantial thickness.

In accordance with the teachings of the prior art, apparatus has been provided for supplying welding current of lower than commercial frequency from a polyphase supply of commercial frequency. These frequencies are substantially lower than the 50 or 60 cycles, and the reactance of the welding transformer is substantially smaller than at 50 or 60 cycles; the skin effect is also substantially reduced. Martin Patent 2,063,258, Sciaky Patents 2,415,708 and 2,431,083 are typical of such systems. Our experience with these systems indicates that they have in common the disadvantage of complexity. The Martin welding system and the system shown in the earlier Sciaky patent include a transformer between the power supply and the welding transformer. Both also include complex timing systems. Martin discloses such a timing system as a block 23 and a relay 18. However, when the requirements which are imposed on the relay are met, an involved and costly mechanism results. The complexity of the control apparatus which must be incorporated in a system, such as Martin's, is indicated in the earlier Sciaky patent. For the operation of Sciaky's Fig. 1 system, for example, three ignitrons and their associated timers and two load relays 34 and 35 are required. The system shown in the later Sciaky patent (Fig. 2) involves six rectifiers designed to carry the load current, ignitrons for example, and associated load contactors.

It is accordingly an object of our invention to provide a low frequency alternating-current welding system of relatively simple structure.

A more general object of our invention is to provide a relatively simple and low cost system for converting power of commercial 60 cycle frequency to a substantially lower frequency.

A further object of our invention is to provide apparatus for supplying power derived from commercial alternating current buses directly to a load at a substantially lower frequency than that of the supply buses.

Still another object of our invention is to provide apparatus for supplying power derived from single phase commercial alternating current buses directly to a load at a substantially lower frequency than that of the buses.

An ancillary object of our invention is to provide a novel full wave rectifier devoid of center tapped conversion transformers between the supply buses and the rectifier components.

Another ancillary object of our invention is to provide a timer for timing current flow through a load which derives its power from a commercial supply but consumes power in the form of intermittent pulses of duration equal to a plurality of half periods of a frequency substantially lower than the commercial frequency.

In accordance with our invention power for welding is derived from the buses of a single phase alternating current source and supplied directly through electric discharge valves such as ignitrons to the load—customarily the primary of the welding transformer. Four electric discharge valves are provided; two each are connected in anti-parallel between one of the buses and opposite terminals of the load. The other bus is connected to an intermediate tap of the load. The discharge valves are so controlled that during alternate time intervals of several periods of the supply duration, two valves, one on each side of the load, conduct. The valves are so selected that the pair which conducts during alternate intervals transmits current of one polarity through the load and the pair which conducts during the intervening intervals transmits current of the opposite polarity through the load. The load is thus supplied with current at a frequency which is equal to the supply frequency divided by twice the number of periods per interval. The conversion is effected without a center tapped conversion transformer between the buses and the load. In accordance with the broader aspects of our invention, a rectifier system including only one valve on each side of the load may be provided.

Figure 2:
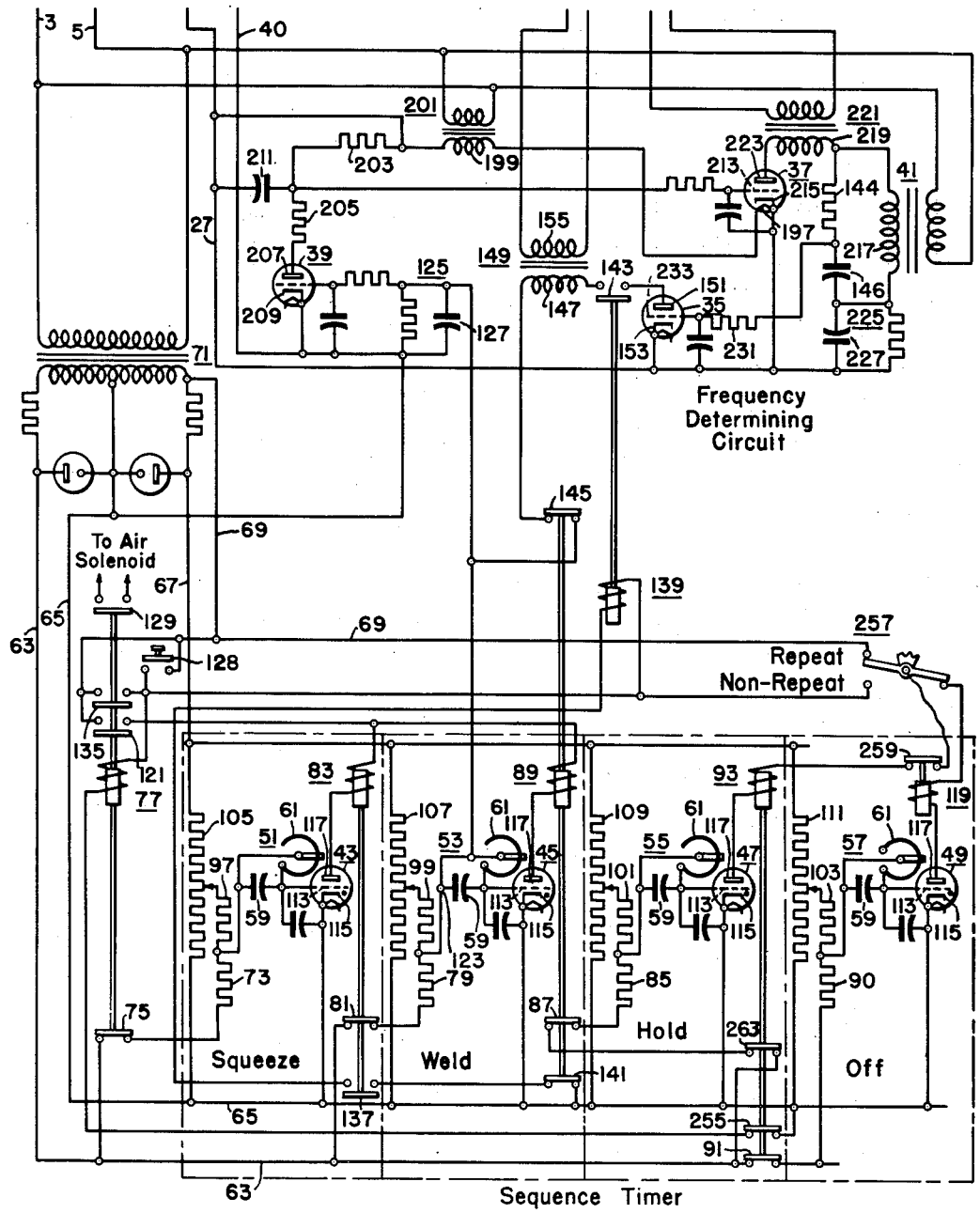
Figure 3:
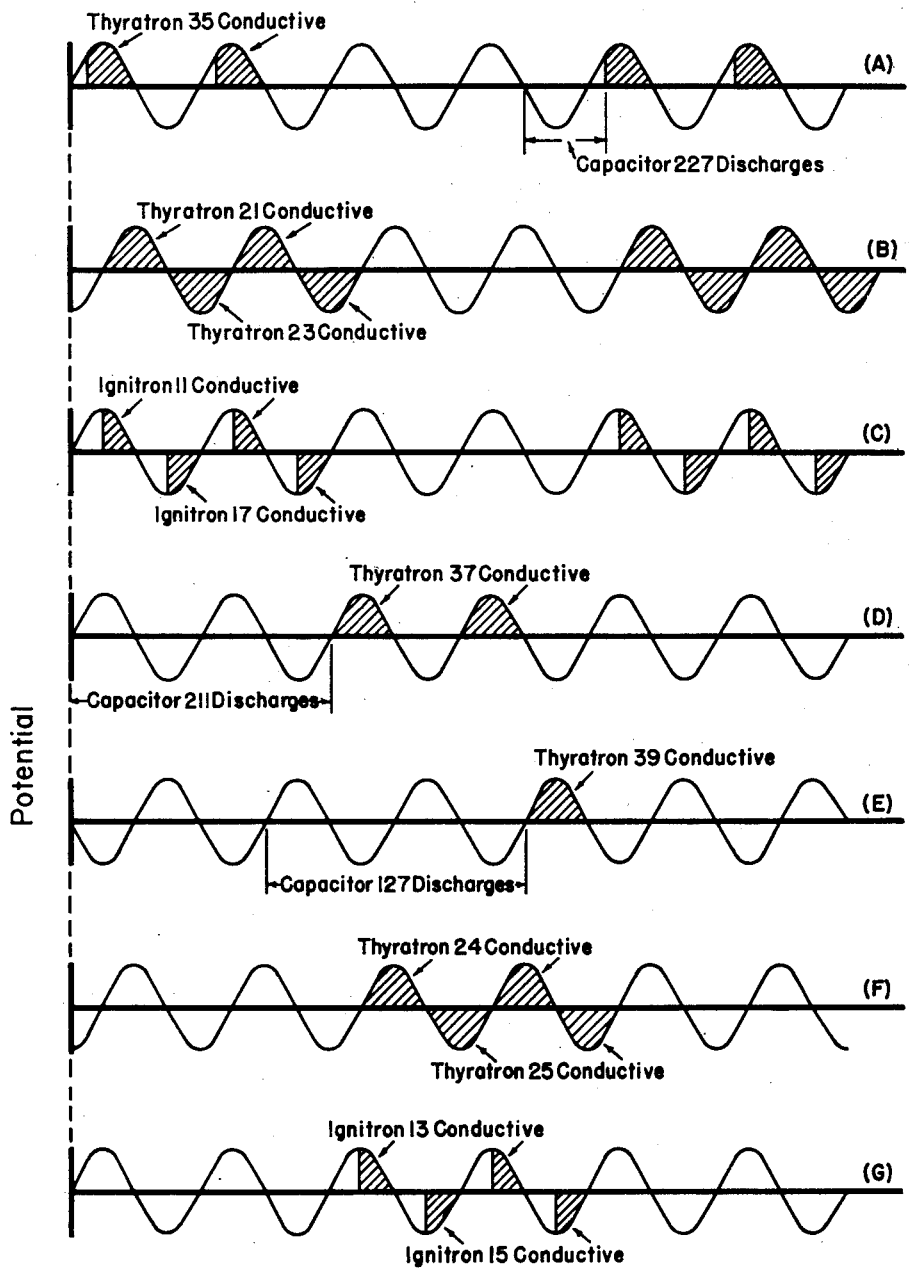

The novel features that we consider characteristic of our invention are set forth with particularity in the appended claims. The invention itself, however, both as to its organization and its method of operation, together with additional objects and advantages thereof, will be understood from the following description of a specific embodiment when read in connection with the accompanying drawings in which:

Figures 1 and 2 together are a circuit diagram showing a preferred embodiment of our invention, and Fig. 3 is a graph illustrating the operation of our invention.

In the apparatus shown in the drawings, power is supplied from buses 3 and 5 usually of a commercial source to the primary 7 of a welding transformer 9. The primary current is conducted through two pairs of cross-connected ignitrons 11, 13, 15 and 17, respectively, one pair 11 and 13 being connected between a bus 5 and one terminal of the primary 7 and the other pair 15 and 17 being connected between the same bus 5 and the opposite terminal of the primary. The primary 7 is provided with an intermediate tap 19 which is connected to the other bus 3. The ignitrons are so controlled that one ignitron 11 of one pair and a corresponding ignitron 17 of the other pair conduct during a predetermined number of successive positive and negative half periods of the supply, while the other ignitrons 13 and 15 are non-conductive and thereafter the latter ignitrons conduct during an equal number of successive half periods of the supply while the former are non-conductive. The ignitrons which are conductive at any time are so selected that current flows through the primary first in one direction and then in the opposite direction. For example, during one group of successive positive and negative half periods, when the left-hand ignitron 11 of the upper group and the right-hand ignitron 17 of the lower group are conductive, current flows through the upper half of the primary 7 when the right-hand bus 5 is positive with respect to the left-hand bus 3 and current flows in the same direction through the lower half of the primary when the left-hand bus 3 is positive with respect to the right-hand bus. During the intervals when the right-hand upper ignitron 13 and the left-hand lower ignitron 15 are conductive current of the opposite polarity flows through the primary. Thus a valve system devoid of transformers which functions to convert power of one frequency to a substantially lower frequency is provided.

On the basis of the teachings of our invention as described above a full wave rectifier of simple structure may be provided. Such a rectifier would include only one valve of each set, the valves conductive during either the positive or negative half periods of the low load frequency, for example, the left-hand upper ignitron 11 and the right-hand lower ignitron 17. Through these ignitrons full wave direct current may be supplied to a load directly. In accordance with the teachings of our invention apparatus may also be provided for converting direct current to alternating current or current of a low frequency to a substantially higher frequency. Such apparatus would include both pairs of ignitrons and in addition the commutating reactances which inverter systems of this type require.

The ignitrons 11 and 17 and 13 and 15 are rendered conductive in their proper sequence by operation of a control circuit, including corresponding pairs of thyrations 21 and 23 and 24 and 25, respectively, connected in anti-parallel in follow circuits. The two ignitrons 11 and 17, which are to conduct during one train of successive positive and negative half periods of the supply, are controlled from one pair (21 and 23) of these cross-connected thyrations and the other ignitrons 13 and 15 are controlled from the other pair 24 and 25. The cross-connected thyrations derive their anode potential from auxiliary buses 27 and 29 supplied from a supply transformer 31 through a phase-shifting network 33. In accordance with the broader aspects of our invention, the phase shifter 33 may be set so that the anode potential supplied to the cross-connected thyrations is at any desired phase relationship to the potential of the main supply (3, 5). Preferably the phase displacement introduced by the phase shifter 33 should be between 10° and 90°. With this phase displacement, the ignitrons controlled from the cross-connected thyrations are rendered conductive at a predetermined instant in the half periods of the supply which follows the instant of zero potential by the phase displacement set. The time between the instant of zero potential and the instant of conductivity is sufficient to enable the last ignitron to conduct current in one direction during any low frequency period to become non-conductive before the first ignitron to conduct current during the succeeding period becomes conductive.

The cross-connected thyratrons 21 to 25 are controlled from a frequency determining circuit. This circuit includes a thyratron 35 and 37 for controlling each pair of cross-connected thyratrons 21 and 23 and 24 and 25, respectively, and an auxiliary thyratron 39 for properly sequencing the conductivity of the thyratrons 35 and 37. The thyratrons 35 and 39 derive their anode potential from the auxiliary buses 27 and 40 and the thyratron 37 derives its anode potential from the main buses 3 and 5 through a transformer 41. Thyratron 39 is so connected that it is normally conductive.

The frequency determining circuit is, in turn, controlled from a sequence timer including Squeeze, Weld, Hold and Off components. Each of the latter components includes a thyratron 43, 45, 47, 49, respectively, in the control circuit of which a timing network 51, 53, 55, 57, respectively, is connected. Each network includes a capacitor 59 and a rheostat 61 through which the capacitor may be discharged. The sequence timer is supplied from auxiliary buses 63, 65, 67 and 69 which derive their power from another supply transformer 71. The Squeeze network 51 is connected at one of its terminals to the bus 63 through a resistor 73 and the normally closed contactor 75 of a start relay 77; the Weld interval 53 is similarly connected through a resistor 79 and the normally closed contactor 81 of the Squeeze relay 83; the Hold network 55 is similarly connected through a resistor 85 and the normally closed contactor 87 of the Weld relay and the Off network 57 is similarly connected through a resistor 99 and the normally closed contactor 91 of the Hold relay 93. The same terminals of the networks 51, 53, 55 and 57 are also connected through resistors 97, 99, 101 and 103, respectively, and rheostats 105, 107, 109, 111, respectively, to another bus 67. At the other terminal each network 51, 53, 55, 57 is connected to the grid 113 of the associated thyratrons 43, 45, 47, 49, respectively. The cathodes 115 of the thyratrons 43, 45, 47, 49 are connected directly to the bus 65 which supplies a potential intermediate that supplied by the buses 63 and 67. The anodes 117 of the thyratrons 43, 45, 47 and 49 are connected each through the coil of its associated relay 83, 89, 93 and 119, respectively, and a normally open contactor 121 of the starting relay 77 to the fourth auxiliary bus 69.

The timing capacitors 59 are charged during the half periods of the auxiliary supply when the auxiliary bus 63 is positive and the bus 65 negative. The charge impresses a bias in the control circuit of the associated thyratrons 43 to 49 and the latter is maintained non-conductive. When the contactor 75, 81, 87 or 91 in the charging circuit of a capacitor 59 is opened the capacitor is discharged and, after a timing interval predetermined by the setting of the rheostat 61, the corresponding thyratron is rendered conductive.

The terminal 123 of the Weld network 53, which is connected to the auxiliary bus 63, is also connected through a time constant network 125 in the control circuit of the auxiliary thyratron 39 of the frequency determining circuit, to the auxiliary bus 65 which is connected to the cathodes 115 of the sequencing thyratrons. So long as the capacitor 127 of this time constant network 125 is charged so that the auxiliary thyratron 39 is non-conductive, the Weld thyratron 45 is also non-conductive, and the Weld interval cannot be terminated. This interconnection between the frequency determining circuit and the sequence timer assures that the flow of welding current is not interrupted before a full low frequency cycle has been completed.

The operation is initiated by closure of a start switch 128, such as a push button or foot switch. This push button, when closed, connects the exciting coil of the starting relay 77 between the auxiliary buses 65 and 69 and the relay is actuated. At the upper now closed contact 129 of the relay 77 a circuit is now closed through a solenoid (not shown) which actuates a mechanism for engaging the welding electrodes 131 with the work 133. At another now closed contact 135 of the start relay 77 the start switch 128 is locked out so that if it is opened during a single welding operation the weld is completed. At the now closed contact 121 of the start relay, the anode circuits for the sequence thyratrons 43, 45, 47 and 49 are closed. At the now open contact 75 the charging circuit for the Squeeze capacitor 59 is opened. The Squeeze capacitor now discharges through the Squeeze rheostat 61 and at the end of a predetermined time interval, the Squeeze thyratron 43 is rendered conductive. Current is now supplied through the exciting coil of the Squeeze relay 83 in a circuit extending from the bus 69 through the closed contact 121, the exciting coil, the thyratron 43 to the bus 65. The Squeeze relay picks up.

At a now closed contact 137 of the Squeeze relay 83 a circuit is closed through the exciting coil of the initiating relay 139 for the frequency determining circuit. This circuit extends from the bus 69 through the lock-in contact 135 of the start relay 77, the exciting coil of the initiating relay 139, the now closed contact 137 of the Squeeze relay 83, a normally closed contact 141 of the Weld relay 89 to the bus 65. The initiating relay 139 is actuated and at its now closed contact 143 in the anode circuit of the first thyratron 35 of the frequency determining circuit is closed. The thyratron 35 is supplied with control potential from the transformer 41 through a phase shift network consisting of a resistor 144 and a capacitor 146 and is rendered conductive at an instant predetermined by the relationship between these components. Current now flows in a circuit extending from one of the buses 40 through the time constant network 125 in the control circuit of the auxiliary thyratron 39, a normally closed contact 145 of the Weld relay 89, the primary 147 of a control transformer 149, the now closed contact 143 of the initiating relay 139, the anode 151 and cathode 153 of the thyratron 35 to the other phase shift bus 27. The current through this thyratron 35 continues to flow so long as it is maintained conductive during each of a series of positive half periods of its supply (27, 28). During each of these half periods a potential pulse is transmitted through the control transformer 149 coupled to the anode circuit of this thyratron.

The operation of thyratron 35 is illustrated in Fig. 3 for a system in which the load frequency is one-fourth the supply frequency. In this figure potential is plotted vertically and time horizontally. Shaded loops represent conductive intervals and unshaded loops non-conductive intervals. For the sake of clarity the potential plotted in each case is the potential which appears across each thyratron and its associated load. Curve A illustrates the operation of thyratron 35. This thyratron is conductive during two successive positive half periods of the supply. Because this thyratron derives its firing potential from the phase shift network 144, 146, it is rendered conductive at an instant in the half periods later than the instant of zero anode potential by the setting of the network.

The secondary 155 of the transformer 149 is connected through a rectifier 157 across a capacitor 159. This capacitor is connected through a bias 161 between the control electrode 163 and the cathode 165 of one of the cross-connected thyratrons 21. Normally the capacitor 159 is maintained discharged by a resistor 167 in parallel with it. When the first thyratron 35 conducts during a positive half period of the supply 27, 40 and a current pulse is transmitted through the transformer 149, the capacitor 159 is charged in such a sense as to render the corresponding cross-connected thyratron 21 conductive. Current now flows through the latter thyratron 21 in a circuit extending from one of the phase shift buses 29 through the primary 169 of a firing transformer 171, the anode 173 and cathode 165 of the thyratron 24 to the other phase shift bus 27. A potential pulse is impressed through the secondary 174 of the firing transformer 171 in the control circuit 175 of a firing thyratron 177 for the upper left-hand ignitron 11. This pulse counteracts the bias 179 in this control circuit and the thyratron 177 is fired in turn firing the ignitron 11. Current now flows from one main bus 5 through the ignitron 11, the upper half of the welding transformer primary 7 to the other main bus 3.

The firing transformer 171 is also provided with an auxiliary secondary 181. Across this secondary a capacitor 183 is connected through a rectifier 185. This capacitor is also connected between the control electrode 163 and the cathode 165 of the associated cross-connected thyratron 23 through a bias 187. Normally the capacitor 183 is maintained discharged by a resistor 189 in parallel with it. During the half period during which current flows through the firing transformer 171, the capacitor 183 is charged to a potential such as to counteract the bias. During the succeeding half periods the corresponding cross-connected thyratron 23 is rendered conductive. Current now flows from the now positive phase shift bus 27 through the primary 191 of a second firing transformer 193, the anode 173 and cathode 165 of the last mentioned thyratron to the other phase shift bus 29. A potential pulse is impressed in the control circuit 175 of the firing thyratron 195 associated with the lower right-hand ignitron 17 and this ignitron is immediately fired. During this second half period then, current flows from the now positive main bus 3 through the lower half of the primary 7 of the welding transformer 9, the ignitron 17 to the other main bus 5. Curves B and C illustrate the operation of thyratrons 21 and 23 and ignitrons 11 and 17, respectively. The thyratrons 21 and 23 are supplied from the buses 27 and 29 and the ignitrons 11 and 17 from the buses 3 and 5. The potential derived from the latter lags the potential derived from the former in phase by the angle determined by the setting of the network 53. Therefore, the firing of the ignitrons 11 and 17 is delayed by this angle as shown.

The primary 7 of the welding transformer has now been supplied with current of the same polarity during two succeeding half periods of the main supply. As the first timing thyratron continues to conduct during succeeding positive half periods the left-hand upper ignitron 11 and the right-hand lower ignitron continue to conduct and the primary 7 of the welding transformer 9 is supplied with current of the same polarity during the corresponding periods of the main supply. The current in the primary 7 thus builds up to a substantial magnitude and the welding current builds up correspondingly.

The auxiliary thyratron 39, which is initially conductive, conducts current in a circuit extending from one phase-shift bus 27, through resistor 203 in parallel with capacitor 211, then through resistor 205 and tube 39 to return to bus 40. A capacitor 211 is connected in parallel with the resistor 203, the secondary 199 and the heater 197 and is charged by the current flow through the thyratron 39. This capacitor is also connected between the control electrode 213 and the cathode 215 of the second thyratron 37 and when it is charged maintains the latter non-conductive. The relationship between the first resistor 203 and the capacitor 211 is such that the control potential derived from the secondary of the heater transformer is displaced in phase by approximately 30° with reference to the anode potential impressed on the second thyratron 37. During this 30° interval this thyratron is maintained non-conductive, even when it is conductive during the remainder of the same half period. The importance of this feature is disclosed and claimed in a copending application Serial No. 47,812, filed September 4, 1948, to Edward C. Hartwig, and assigned to the Westinghouse Electric Corporation. So long as the auxiliary thyratron 39 remains conductive and the capacitor remains charged, however, the second timer thyratron 37 remains non-conductive.

When the first thyratron 35 is conductive, the capacitor 127 in the time constant network 125 of the auxiliary thyratron 39 is charged to a potential at which it biases off the thyratron 39. This potential builds up during the first half period of the main supply during which the first thyratron 35 conducts. During this half period the auxiliary thyratron 39 is non-conductive since it is connected oppositely to the first thyratron 35, however, during the succeeding half period the auxiliary thyratron 39 becomes non-conductive.

When the auxiliary thyratron 39 is rendered non-conductive, the capacitor 211 discharges through the resistor 203 and the other components in series with it and after a predetermined time interval the second thyratron 37 becomes conductive. The anode potential for thyratron 37, derived from the main buses 3 and 5 through the transformer 41, is in phase with the anode potential for thyratron 35 derived from the phase shift buses 27 and 40. With the capacitor 211 discharged, the thyratron 37 fires substantially at the beginning of its positive half periods (supply frequency). Thyratron 37 thus fires before thyratron 35 would fire during the same half period. The components of the discharge circuit for the capacitor 211 and the capacity are so selected that the thyratron 37 is rendered conductive during the positive half period (supply frequency) immediately following the last of the successive half periods (supply frequency) during which the thyratron 35 is to conduct during a half period of the load frequency. The operation of thyratron 37 is illustrated in curve D of Fig. 3.

When the thyratron 37 conducts, current flows from one terminal of the secondary 217 of the supply transformer 41 through the primary 219 of another transformer 221, the anode 223 and cathode 215 of the thyratron 37, another time constant network 225, to the other terminal of the secondary 217. The capacitor 227 in this network is immediately charged. This capacitor 227 is connected through the capacitor 146 and a grid resistor 231 between the control electrode 233 and the cathode 153 of the first thyratron 35. While the second thyratron 37 conducts during the early portion of its first conductive half period, the time constant capacitor 227 becomes sufficiently charged to bias the first thyratron 35 to cut off (curve A, Fig. 3) and the latter now fails to fire during its positive half period (supply potential). When the thyratron 35 becomes non-conductive, the charging of the time constant capacitor 127 in the control circuit of the auxiliary thyratron 39 is interrupted and the latter capacitor discharges through its associated resistor and thyratron 39 becomes conductive. When the auxiliary thyratron 39 becomes conductive, it immediately charges the capacitor 211 in its anode circuit to render the second thyratron 37 non-conductive. The capacitor in the anode circuit of the second thyratron 37 is now discharged and the first thyratron 35 is rendered conductive. The anode potential of thyratron 39 is opposite in phase to the anode potentials of the other thyratrons 35 and 37 and it fires during a half period (supply potential) when the anode potential of thyratron 37 is negative. The discharge time of the capacitor 125 is so set that thyratron 39 becomes conductive during the half period following the last desired conductive half period of the thyratron 37. Thyratron 37 then fails to conduct during its next positive half period, and during this half period the capacitor 227 becomes sufficiently discharged to permit thyratron 35 to become conductive. The operation of thyratron 39 is illustrated in curve E.

The second thyratron 37 conducts during a series of positive half periods of the main supply. (Curve D, Fig. 3.) During each of these half periods a capacitor 235 in the control circuit of one of the remaining cross-connected thyratrons 24 is charged in such a sense that a bias 237 in this control circuit is counteracted and this thyratron is rendered conductive. (Curve F, Fig. 3.) Current now flows through a firing transformer 239, the primary 241 of which is connected in the anode circuit of this cross-connected thyratron 24. A potential pulse is induced in the control circuit 243 of the firing thyratron 245 associated with the lower left-hand ignitron 15 to render this firing thyratron conductive. The corresponding ignitron 15 now becomes conductive conducting current in a circuit extending from a now positive bus 5 of the main supply through the ignitron 15, the lower half of the primary 7 of the welding transformer 9, to the other bus 3. (Curve G, Fig. 3.) Because the firing of ignitron 15 is delayed by the phase angle set by network 33, the flux in the transformer 9 has time to delay before ignitron 15 becomes conductive and ignitron 17 is extinguished before ignitron 15 conducts.

Through an auxiliary secondary 247 of the firing transformer 239, the cross-connected thyratron 25 associated with the conductive thyratron 24 is rendered conductive during a succeeding half period of the main supply. Through another firing transformer 249, the firing thyratron 251 associated with the upper right-hand ignitron 13 is rendered conductive and current now flows from a positive bus 3 through the upper half of the primary 7 of the welding transformer 9, the ignitron 13 to the remaining bus 5. So long as the second thyratron 37 remains conductive, current flows upward through each of the halves of the primary 7 in its turn.

During succeeding positive and negative half periods of the main supply (3, 5), the primary current and the corresponding secondary current is accordingly built up. This current is opposite in polarity to the current supplied through the pair of ignitrons 11 and 17 which were initially conductive.

When the first thyratron 35 again becomes conductive, the latter pair of ignitrons (11 and 17) is again rendered conductive and current flows downward through the primary. Before the first thyratron becomes conductive the second thyratron 37 has become non-conductive by reason of the current conducted to its time constant network by the auxiliary thyratron 39. The first and second thyratrons 35 and 37 and their associated pairs of ignitrons 11 and 17 and 15 and 13 respectively thus continue to conduct so long as the initiating relay 139 remains actuated.

This time interval is terminated by the Weld component. When the Squeeze relay 83 is actuated the normally closed contactor 137 through which the Weld capacitor 59 is charged is opened and the latter discharges through its associated rheostat. Following this discharge and the discharge of the time constant capacitor 125 in the control circuit of the auxiliary thyratron 39, the Weld thyratron 45 is rendered conductive. This event can only occur after the first thyratron 35 has become non-conductive.

When the first thyratron 35 again becomes conductive the Weld relay 89 is actuated and opens the anode circuit of the first thyratron 35 at the now open contactor 145. At its now open lower contactor 141 the Weld relay 89 also opens a circuit through the exciting coil of the initiating relay 139, the initiating relay drops out. Since current is not flowing at this time through this circuit, the actuation or the Weld relay has no immediate effect on the welding operation. The second thyratron 37, which may now be conductive, continues to conduct until the auxiliary thyratron 39, which is now conductive, conducts sufficient current to charge the biasing capacitor 211 of this thyratron 37 to render it non-conductive. One weld has now been produced. The interconnection of the Weld network 53 and the time constant network 123 assures that equal positive and negative half waves of the load frequency are supplied.

At the third now open contact 87 of the Weld relay 89 the charging circuit for the Hold capacitor 59 is opened. A predetermined time interval after this event occurs the Hold thyratron 47 is rendered conductive and actuates the Hold relay 93. At one of the now open contacts 255 of the Hold relay 93 the circuit through the exciting coil of the start relay 77 is opened and the start relay drops out. The Squeeze relay 83 and Weld relay 89 and their associated thyratrons 43 and 45, which were maintained energized through the contact 121 of the start relay 77, are now deenergized. The Hold relay 93 and the Hold thyratron 47 remain energized because the anode circuit of the Hold thyratron, in which the exciting coil of the Hold relay is connected, is supplied from the buses 69 and 65 through the Repeat non-repeat switch 257 and the normally closed contact 259 of the Off relay 119. The Hold capacitor 59 is maintained discharged after the Weld relay drops out (and contactor 87 closes) because a normally closed contact 263 of the Hold relay 93 through which it is charged is now open.

When the Hold relay 93 is actuated it also opens the charging circuit for the Off capacitor 59 at its now open contacts 91. At the end of the Off interval the Off thyratron 49 is rendered conductive and the Off relay 119 is actuated. At the now open contact 259 of the Off relay 119 the anode circuit of the Hold thyratron 47 is opened. The Hold relay 93 then drops out. The Off capacitor 59 is now recharged and the system is completely reset at a second operation. If the start switch 128 remains closed, this second operation follows. It is similar to the first operation.

Although we have shown and described a certain specific embodiment of our invention, we are fully aware that many modifications thereof are possible. Our invention, therefore, is not to be restricted except insofar as is necessitated by the prior art and the spirit of the appended claims.

We claim as our invention:

1. For use with a load device having first, second and third terminals, to be supplied from first and second buses of a single phase source the combination comprising, a first asymmetrically conductive electric discharge device having an anode and a cathode connected between said first bus and said first terminal so as to conduct current to one polarity to said load device, a second asymmetrically conductive electric discharge device having an anode and a cathode connected in anti-parallel with said first discharge device, a third asymmetrically conductive electric discharge device having an anode and a cathode connected between said first bus and said second terminal so as to conduct current of said one polarity to said load device, a fourth asymmetrically conductive electric discharge device having an anode and a cathode connected in anti-parallel with said third discharge device and means for connecting said second bus to said third terminal.

2. For use with a load device having first, second and third terminals to be supplied from first and second buses of a single phase source the combination comprising, a first asymmetrically conductive electric discharge device having an anode and a cathode connected between said first bus and said first terminal so as to conduct current of one polarity to said load device, a second asymmetrically conductive electric discharge device having an anode and a cathode connected in anti-parallel with said first path, a third asymmetrically conductive electric discharge device having an anode and a cathode connected between said first bus and said second terminal so as to conduct current of said one polarity to said load device, a fourth asymmetrically conductive electric discharge device having an anode and a cathode connected in anti-parallel with said third discharge device, means for connecting said second bus to said third terminal and connections to said discharge devices for rendering conductive said first and third discharge devices during a predetermined number of half periods of said source and thereafter rendering conductive said second and fourth discharge devices during a succeeding predetermined number of half periods of said source.

3. For use in the transfer of power from a single phase supply to a single phase load, in combination, a first conductor, first and second asymmetrically conductive electric discharge devices, each having an anode and a cathode connected in anti-parallel, in series with said conductor and said load across said supply, a second conductor, third and fourth electric discharge devices connected in anti-parallel, in series with said second conductor and said load across said supply, connections for rendering said first and third discharge devices conductive in succession and connections for rendering said second and fourth discharge devices conductive in succession, each of said discharge devices being conductive to the end of its corresponding half periods of the supply.

4. For use in the transfer of power from a single phase supply to a single phase load, a first terminal and a second terminal to which a supply of alternating current may be connected; a first conductor connected to said first terminal; a second conductor connected to said second terminal; first and second asymmetrically conductive electric discharge devices connected in anti-parallel, in series with said first conductor and said load across said supply; third and fourth asymmetrically conductive discharge devices in anti-parallel in series with said second conductor and said load across said supply; first connections for rendering said first and third discharge devices conductive during successive half periods of opposite polarity of said alternating current supply and second connections for rendering said second and fourth devices conductive during other successive half periods of opposite polarity of said alternating current supply.

5. A first terminal and a second terminal to which a single phase supply of alternating current may be connected; a first conductor connected to said first terminal; a first asymmetrically conductive electric discharge device connected in series with said first conductor so as to conduct current of one polarity from said first terminal; a second asymmetrically conductive electric discharge device connected in anti-parallel to said first discharge device; a second conductor connected to said first terminal; a third asymmetrically conductive electric discharge connected in series with said second conductor to conduct current of said one polarity from said first terminal and a fourth asymmetrically conductive electric discharge device connected in anti-parallel to said third discharge device.

6. A first terminal and a second terminal to which supply of single phase alternating current may be connected; a first conductor connected to said first terminal; a first asymmetrically conductive electric discharge device connected in series with said first conductor so as to conduct current of one polarity from said first terminal; a second asymmetrically conductive electric discharge device connected in anti-parallel to said first discharge device; a second conductor connected to said first terminal; a third asymmetrically conductive electric discharge device connected in series with said second conductor to conduct current of said one polarity from said first terminal; a fourth asymmetrically conductive electric discharge device connected in anti-parallel to said third discharge device, connections for rendering said first and third discharge devices conductive during successive half periods of opposite polarity of said single phase alternating supply and connections for rendering said second and fourth discharge devices during other successive half periods of opposite polarity of said single phase supply.

7. A first terminal and a second terminal to which a supply of single phase alternating current may be connected; a first conductor connected to said first terminal; a first asymmetrically conductive electric discharge connected in series with said first conductor so as to conduct current of one polarity from said first terminal; a second asymmetrically conductive electric discharge device connected in anti-parallel to said first discharge device; a second conductor connected to said first terminal; a third asymmetrically conductive electric discharge device connected in series with said second conductor to conduct current of said one polarity from said first terminal; a fourth asymmetrically conductive electric discharge device connected in anti-parallel to said third discharge device, connections for periodically rendering conductive said first and third discharge devices and said second and fourth discharge devices during alternate intervals of duration equal to a pre-determined number of periods of said single phase current supply.

8. A first terminal and a second terminal to which a supply of single phase alternating current may be connected; a first conductor connected to said first terminal; a first asymmetrically conductive electric discharge device connected in series with said first conductor so as to conduct current of one polarity from said first terminal; a second asymmetrically conductive electric discharge device connected in anti-parallel to said first discharge device; a second conductor connected to said first terminal; a third asymmetrically conductive electric discharge device connected in series with said second conductor to conduct current of said one polarity from said first terminal; a fourth asymmetrically conductive electric discharge device connected in anti-parallel to said third path, connections including a first pair of auxiliary asymmetrically conductive electric discharge devices coupled in anti-parallel between said terminals and said first and third discharge devices for rendering said first and third discharge devices conductive during successive half periods of opposite polarity of said current and connections including a second pair of auxiliary asymmetrically conductive electric discharge devices coupled in anti-parallel between said terminals and said second and fourth discharge devices.

9. In combination, a first terminal and a second terminal to which a single phase supply of alternating current may be connected; a first principal asymmetrically conductive electric discharge device connected to said first terminal to conduct current of one polarity from said terminal; a second main asymmetrically conductive electric discharge device connected to said first terminal to conduct current of said one polarity from said terminal; a first auxiliary asymmetrically conductive electric discharge device coupled between said terminals and said first principal discharge device for rendering said first principal discharge device conductive and a second auxiliary asymmetrically conductive electric discharge device coupled in anti-parallel to said first auxiliary discharge device between said terminals and said second principal discharge device for rendering said second principal discharge device conductive.

10. In combination a first terminal and a second terminal to which a single phase supply of alternating current may be connected; a first principal asymmetrically conductive electric discharge device connected to said first terminal to conduct current of one polarity from said terminal; a second main asymmetrically conductive electric discharge device connected to said first terminal to conduct current of said one polarity from said terminal; a first auxiliary asymmetrically conductive electric discharge device coupled between said terminals and said first principal discharge device for rendering said first principal discharge device conductive and a second auxiliary asymmetrically conductive electric discharge device coupled in a follow circuit in anti-parallel to said first auxiliary discharge device between said terminals and said second principal discharge device for rendering said second principal discharge device conductive and a third auxiliary discharge device for rendering said first auxiliary discharge device conductive during a predetermined number of alternate half periods of said single phase supply.

11. In combination a first electric discharge device having an anode and a cathode, a second electric discharge device having an anode and a cathode, means for connecting the anode of the first discharge device to the cathode of the second, means for connecting the anode of the second discharge device to the cathode of the first, a third electric discharge device coupled to said first and second discharge devices for rendering said first and second discharge devices conductive when said third discharge device is conductive, a fourth electric discharge device having an anode and a cathode, a fifth electric discharge device having an anode and a cathode, means for connecting the anode of the fourth discharge device to the cathode of the fifth discharge device, means for connecting the anode of the fifth discharge device to the cathode of the fourth discharge device, a sixth discharge device coupled to said fourth and fifth discharge devices for rendering said fourth and fifth discharge devices conductive when said sixth discharge device is conductive and connecting between said third and sixth discharge devices for rendering said sixth discharge device conductive after said third discharge device is conductive.

12. In combination a first electric discharge device having an anode, a cathode, and a control electrode, a second electric discharge device having an anode, a cathode, and a control electrode, means for connecting the anode of the first discharge device to the cathode of the second, means for connecting the anode of the second discharge device to the cathode of the first, a follow connection between the anode of the first path and the control electrode of the second, a third electric discharge device coupled to said control electrode of said first discharge device for rendering said first discharge device conductive when said third discharge device is conductive, a fourth electric discharge device having an anode, a cathode, and a control electrode, a fifth electric discharge device having an anode, a cathode, and a control electrode, means for connecting the anode of the fourth discharge device to the cathode of the fifth discharge device to the cathode of the fourth discharge device, a follow connection between the anode of the fourth discharge device and the control electrode of the fifth, a sixth discharge device coupled to said control electrode of said fourth discharge device for rendering said fourth discharge device conductive when said sixth discharge device is conductive and connections between said third and sixth discharge devices for rendering said sixth discharge device conductive after said third discharge device is conductive.

13. For use with an inductive load device having first and second terminals and a center tap terminal, to be supplied from first and second buses of a single phase source the combination comprising, a first asymmetrically conductive electric discharge device having an anode and a cathode connected between said first bus and said first terminal so as to conduct current of one polarity to said load device, a second asymmetrically conductive electric discharge device having an anode and a cathode connected in anti-parallel with said first discharge device, a third asymmetrically conductive electric discharge device having an anode and a cathode connected between said first bus and said second terminal so as to conduct current of said one polarity to said load device, a fourth asymmetrically conductive electric discharge device having an anode and a cathode connected in anti-parallel with said third discharge device, and means for connecting said second bus to said center tap terminal.

JOHN R. PARSONS.
CLARENCE B. STADUM.

No references cited.